(12) United States Patent
Liu (10) Patent No.: US 10,476,867 B2
(45) Date of Patent: Nov. 12, 2019

(54) SENSITIVE OPERATION PROCESSING PROTOCOL

(71) Applicant: Tencent Technology (Shenzhen) Company Limited, Shenzhen (CN)

(72) Inventor: Jie Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 258 days.

(21) Appl. No.: 15/462,768

(22) Filed: Mar. 17, 2017

(65) Prior Publication Data

US 2017/0195312 A1  Jul. 6, 2017

Related U.S. Application Data

(63) Continuation of application No. PCT/CN2016/078351, filed on Apr. 1, 2016.

(30) Foreign Application Priority Data

Apr. 13, 2015 (CN) .......................... 2015 1 01707137

(51) Int. Cl.
  *G06F 15/16* (2006.01)
  *G06F 17/30* (2006.01)
  (Continued)

(52) U.S. Cl.
  CPC ........ *H04L 63/083* (2013.01); *G06F 21/6218* (2013.01); *G06F 2221/2141* (2013.01); *H04W 4/14* (2013.01)

(58) Field of Classification Search
  CPC combination set(s) only.
  See application file for complete search history.

(56) References Cited

U.S. PATENT DOCUMENTS 6,990,470 B2 * 1/2006 Hogan ................... G06Q 20/04
                                                                380/277
2008/0046715 A1  2/2008 Balazs et al.
(Continued)

FOREIGN PATENT DOCUMENTS

CN       1514573 A     7/2004
CN     101114237 A     1/2008
(Continued)

OTHER PUBLICATIONS

"Han-Na You, Jae-Sik Lee, Jung-Jae Kim, Moon-Seog Jun, 5th International Conference on Computer Sciences and Convergence Information Technology, Nov. 30-Dec. 2, 2010, IEEE, INSPEC Accession #: 11833144" (Year: 2010).*
(Continued)

*Primary Examiner* — Phy Anh T Vu
(74) *Attorney, Agent, or Firm* — Brinks Gilson & Lione (57) ABSTRACT

The present disclosure belongs to the field of network technologies, and disclosed are a sensitive operation processing protocols. The method includes: receiving a sensitive operation request, the sensitive operation request carrying a first feature sequence and sensitive operation information; obtaining a user account corresponding to the first feature sequence according to the first feature sequence and a preset conversion relationship between feature sequences and user accounts; and executing a sensitive operation on the basis of the user account corresponding to the first feature sequence and the sensitive operation information. According to the present disclosure, when a sensitive operation is performed, a user account is no longer directly used to perform a sensitive operation request; instead, the user account is replaced with a feature sequence uniquely identifying the user account.

9 Claims, 3 Drawing Sheets

(51) Int. Cl.
*H04L 29/06* (2006.01)
*G06F 21/62* (2013.01)
*H04W 4/14* (2009.01)

(56) References Cited

U.S. PATENT DOCUMENTS

| | | | |
|---|---|---|---|
| 2008/0092216 A1* | 4/2008 | Kawano | G06F 21/46 726/5 |
| 2010/0100952 A1* | 4/2010 | Sample | H04L 51/066 726/9 |
| 2010/0175120 A1* | 7/2010 | Tien | H04L 63/0853 726/9 |
| 2010/0274669 A1* | 10/2010 | Carlson | G06Q 30/0261 705/14.58 |
| 2011/0098030 A1* | 4/2011 | Luoma | H04M 3/42153 455/419 |
| 2011/0126274 A1* | 5/2011 | Sadeckas | G06F 21/335 726/7 |
| 2012/0292388 A1* | 11/2012 | Hernandez | G06Q 20/108 235/379 |
| 2014/0033291 A1 | 1/2014 | Liu | |
| 2015/0199689 A1* | 7/2015 | Kumnick | G06Q 20/3674 705/67 |

FOREIGN PATENT DOCUMENTS

| | | |
|---|---|---|
| CN | 102187346 A | 9/2011 |
| CN | 102739708 A | 10/2012 |
| CN | 102750486 A | 10/2012 |
| CN | 103413104 A | 11/2013 |

OTHER PUBLICATIONS

"R. A. Ivantsiv; U. Marikuca, Principals of functioning of two-channel analysing system, May 21-24, 2008, IEEE, INSPEC Accession #: 10201943" (Year: 2008).*

International Search Report with English translation, dated Jul. 8, 2016, pp. 1-4, issued in International Patent Application No. PCT/CN2016/078351, State Intellectual Property Office of P.R. China, Beijing, China.

Office Action dated Apr. 30, 2019 for Chinese Application No. 201510170713.7 with concise English Translation, 7 pages.

* cited by examiner

SENSITIVE OPERATION PROCESSING PROTOCOL

RELATED APPLICATION

This application is a continuation of International Application PCT/CN2016/078351, filed Apr. 1, 2016, which claims priority to Chinese Patent Application No. 2015101707137, entitled "SENSITIVE OPERATION PROCESSING METHOD AND APPARATUS", filed on Apr. 13, 2015, both of which are incorporated herein by reference in their entirety.

FIELD OF THE TECHNOLOGY

The present disclosure relates to the field of network technologies, and in particular, to a sensitive operation processing protocol.

BACKGROUND OF THE DISCLOSURE

With the popularity of network technologies, daily activities such as communication and work increasingly rely on network. To provide personalized services and privacy protection, websites and application providers provide security services such as accounts and account passwords for users. The users may register their own accounts with the websites or applications and set account passwords, so that in a subsequent use process, by using the accounts and account passwords, the users can enjoy services provided by the websites and applications.

In real life, users may need to perform a sensitive operation on their own accounts in many cases. For example, when a user wants to modify a password, the user may modify the password on the basis of some information set by the user. A common method for modification is: A user sends an SMS message in a preset format to a specified number by using a cell phone, for example, the preset format may be "GM#QQ number#new password", so that when receiving the SMS message, a server can modify a password corresponding to the QQ number according to specific content of the SMS message.

In a process of implementing the present disclosure, the inventor finds that the existing technology has at least the following problems:

When a sensitive operation such as password modification is performed, a sent SMS message includes an account and a new password of a user. Once the SMS message is intercepted, the account and the new password of the user may be known by another person, causing a potential security threat. Therefore, security of an existing sensitive operation method is relatively low.

SUMMARY

To resolve the problem in the existing technology, embodiments of the present invention provide a sensitive operation processing method and apparatus. The technical solutions are as follows:

According to one aspect, an embodiment of the present invention provides a sensitive operation processing method, including:

receiving a sensitive operation request, the sensitive operation request carrying a first feature sequence and sensitive operation information; obtaining a user account corresponding to the first feature sequence according to the first feature sequence and a preset conversion relationship between feature sequences and user accounts; and executing a sensitive operation on the basis of the user account corresponding to the first feature sequence and the sensitive operation information.

According to another aspect, a sensitive operation processing apparatus is provided, including:

a receiving module, configured to receive a sensitive operation request, the sensitive operation request carrying a first feature sequence and sensitive operation information;

an obtaining module, configured to obtain a user account corresponding to the first feature sequence according to the first feature sequence and a preset conversion relationship between feature sequences and user accounts; and a processing module, configured to execute a sensitive operation on the basis of the user account corresponding to the first feature sequence and the sensitive operation information.

According to still another aspect, a server is provided, including:

a receiver, a sender, a processor connected to the receiver and the sender, and a memory connected to the processor, the memory being configured to store instructions executed by the processor;

the receiver being configured to receive a sensitive operation request, the sensitive operation request carrying a first feature sequence and sensitive operation information; and the processor being configured to execute the instructions stored by the memory, so as to execute the following operations: obtaining a user account corresponding to the first feature sequence according to the first feature sequence and a preset conversion relationship between feature sequences and user accounts after the receiver receives the sensitive operation request; and executing a sensitive operation on the basis of the user account corresponding to the first feature sequence and the sensitive operation information.

Beneficial effects brought about by the technical solutions provided in the embodiments of the present invention are:

When a sensitive operation is performed, a sensitive operation request no longer directly carries a user account when being sent; instead, the user account is replaced with a feature sequence uniquely identifying the user account, so that other people cannot obtain the user account on the basis of the feature sequence even if they know the sensitive operation request, thereby avoiding leakage of user information and improving security.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes implementation manners of the present invention in detail with reference to the accompanying drawings.

Figure 1:
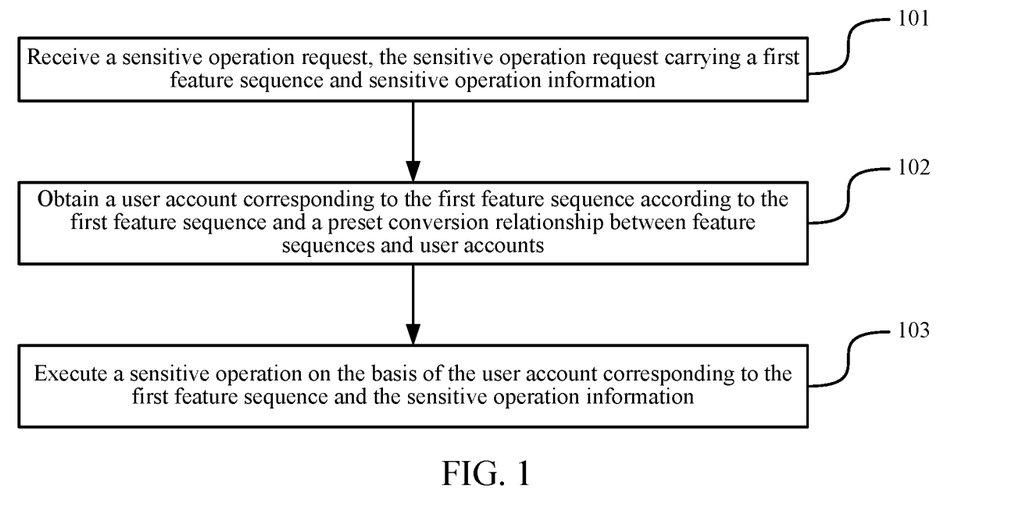
FIG. 1 is a flowchart of a sensitive operation processing method according to an embodiment of the present invention.

FIG. 1 is a flowchart of a sensitive operation processing method according to an embodiment of the present invention. Referring to FIG. 1, the method includes:

101: Receive a sensitive operation request, the sensitive operation request carrying a first feature sequence and sensitive operation information.

The sensitive operation request refers to a sensitive operation-related requirement initiated by a user to a server. The sensitive operation refers to some important operations relating to a user account and property security, and this type of operations may affect the user privacy, property security, and the like. Therefore, an operation environment is required to be highly secure. Typical sensitive operations may be operations such as modification of an account password and change of a password-protection tool.

In this embodiment of the present invention, the first feature sequence is used for uniquely identifying a user account. When some sensitive operations are performed, if the user account needs to be used, the first feature sequence may be used for replacing the user account, so as to improve security of the user account. It should be noted that the first feature sequence may be provided by a service provider to a user. Certainly, the first feature sequence may be provided by a third-party verification server to a user. This is not limited in this embodiment of the present invention.

The sensitive operation information is used for limiting a specific sensitive operation being executed by a user or a specific parameter of a sensitive operation executed by a user. For example, if the current sensitive operation is a login operation, the sensitive operation information may be an operation identifier of the login operation; if the current sensitive operation is modifying a user account password, the sensitive operation information may be a new password after the modification.

In an actual scenario, a user may send the sensitive operation request to the server by logging in to a sensitive operation webpage or sending an SMS message. When receiving the sensitive operation request, the server may read the first feature sequence and the sensitive operation information carried in the sensitive operation request, so as to perform a subsequent process according to the first feature sequence and the sensitive operation information.

The sensitive operation webpage may be a webpage opened by an embedded browser lock of an application client, or may be a webpage opened by using a browser. This is not specifically limited in this embodiment of the present invention.

102: Obtain a user account corresponding to the first feature sequence according to the first feature sequence and a preset conversion relationship between feature sequences and user accounts.

In this embodiment of the present invention, the preset conversion relationship between feature sequences and user accounts may be a list, stored in the server, of feature sequences and user accounts that are one-to-one manner corresponding to each other, as shown in Table 1. After obtaining a feature sequence, the server may obtain a user account corresponding to the feature sequence by searching the table. This manner may reduce the load of calculation on the server side. For example, when the feature sequence is B1, it can be known that a corresponding user account is A1 by searching Table 1.

TABLE 1

| | User account | | |
|---|---|---|---|
| | A1 | A2 | ... |
| Feature sequence | B1 | B2 | ... |

In addition, the preset conversion relationship between feature sequences and user accounts may also be an algorithm. The server converts a feature sequence into a user account by using the preset specified algorithm. For example, the server converts the first feature sequence into the corresponding user account by using the preset specified algorithm.

103: Execute a sensitive operation on the basis of the user account corresponding to the first feature sequence and the sensitive operation information.

Executing a sensitive operation refers to a process in which the server responds to the sensitive operation request, and processes the user account according to the sensitive operation information carried in the sensitive operation request.

According to the method provided in this embodiment of the present invention, when a sensitive operation is performed, a sensitive operation request no longer directly carries a user account when being sent; instead, the user account is replaced with a feature sequence uniquely identifying the user account, so that other people cannot obtain the user account on the basis of the feature sequence even if they know the sensitive operation request, thereby avoiding leakage of user information and improving security.

Optionally, before the receiving a sensitive operation request, the method further includes:

receiving a feature sequence obtaining request, where the sequence obtaining request carries the user account;

converting the user account into the first feature sequence, and saving a conversion relationship between the first feature sequence and the user account, where the first feature sequence is used for uniquely identifying the user account; and providing sensitive operation instruction information to a user according to the first feature sequence, where the sensitive operation instruction information includes at least the first feature sequence.

It should be noted that for each user account, a same specified algorithm may be used in a server conversion process. Certainly, to reduce the possibility of being cracked, user accounts may be grouped, and different specified algorithms may be used for different groups of user accounts. This is not specifically limited in this embodiment of the present invention.

Optionally, the converting the user account into the first feature sequence includes:

converting the user account into a feature sequence by using a specified algorithm;

determining whether the preset conversion relationship between feature sequences and user accounts includes the feature sequence;

using the feature sequence as the first feature sequence of the user account if the preset conversion relationship between feature sequences and user accounts does not include the feature sequence; and adding a specified value to the feature sequence, and continuing to perform the determining process until the preset conversion relationship between feature sequences and user accounts does not include a modified feature sequence, if the preset conversion relationship between feature sequences and user accounts includes the feature sequence.

To prevent duplication of the generated feature sequences, a deduplication mechanism needs to be established, so that a correspondence between feature sequences and user accounts is a one-to-one correspondence, and error processing on the server side can be avoided.

Optionally, after the providing sensitive operation instruction information to a user according to the first feature sequence, the method further includes:

deleting the conversion relationship between the first feature sequence and the user account when it is detected that a page applying to obtain a sequence is closed; or deleting the conversion relationship between the first feature sequence and the user account when the sensitive operation request is not received within a specified time.

Optionally, the user account is a combination of at least two of three types of characters: digit, letter, and symbol.

The foregoing optional technical solutions can form an optional embodiment of the present invention by using any combination, and details are not described herein.

Figure 2:
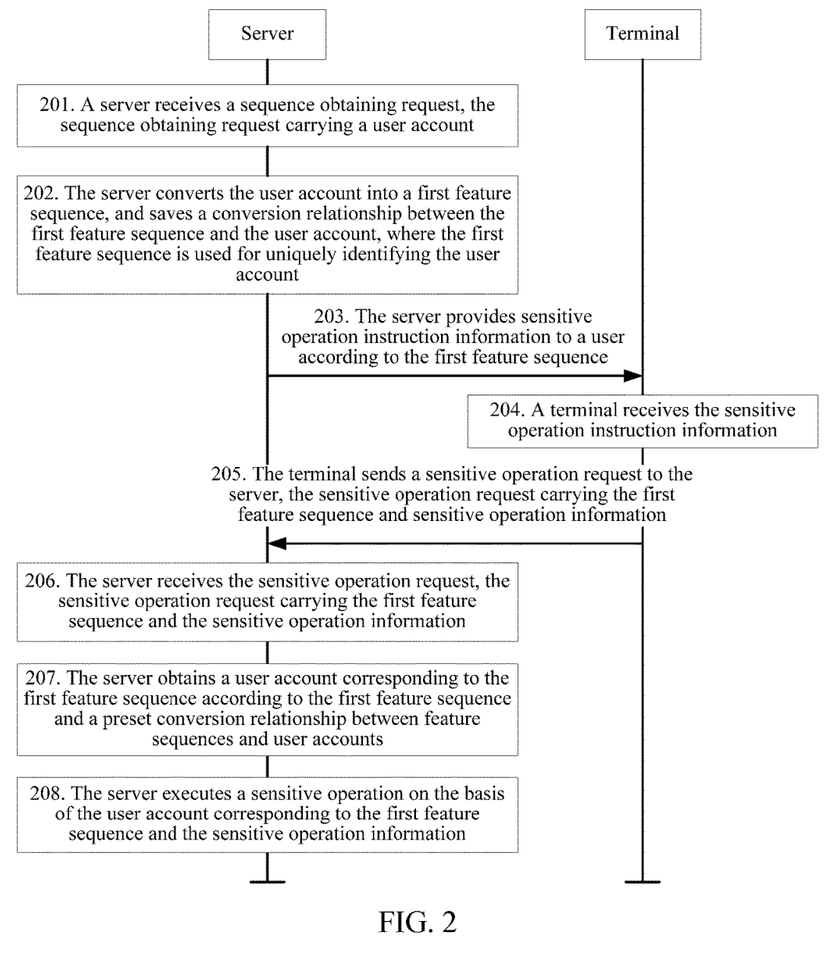
FIG. 2 is a flowchart of a sensitive operation processing method according to an embodiment of the present invention.

FIG. 2 is a flowchart of a sensitive operation processing method according to an embodiment of the present invention. Referring to FIG. 2, the method includes:

201: A server receives a sequence obtaining request, the sequence obtaining request carrying a user account.

To execute a sensitive operation, a user may log on to the server on a terminal, and send the sequence obtaining request to the server. The user may log on to the server in a manner such as webpage login or application client login. For example, the server may provide the terminal with a sequence obtaining page related to the sensitive operation. When executing a sequence obtaining operation on the sequence obtaining page by using the terminal, the user triggers the sequence obtaining request, and sends the sequence obtaining request to the server. In an actual scenario, the sequence obtaining operation may be clicking a sequence obtaining button on the sequence obtaining page, sending a sequence obtaining message to a specified account, sending a sequence obtaining email to an email box, or the like.

For example, in a scenario of account password modification, a modification button (which, for example, applies to modify a QQ account password) may be provided on an account password modification page. When detecting an operation of clicking the modification button by a user, the terminal triggers the sequence obtaining operation, so that the terminal sends the sequence obtaining request to the server.

(2) When a user needs to perform a sensitive operation on the user account, the user may edit an SMS message in a specified format and send the message to a specified number by using a cell phone or a phone number bound with the user account, and the server may obtain the user account by using the cell phone or the phone number bound with the user account.

202: The server converts the user account into a first feature sequence, and saves a conversion relationship between the first feature sequence and the user account, where the first feature sequence is used for uniquely identifying the user account.

Specifically, the server may convert the user account into a first feature sequence according to a preset algorithm, and save a conversion relationship between the first feature sequence and the user account. The user account may be formed by a combination of at least two of three types of characters: digit, letter, and symbol. For example, the user account may be a simple combination of digits, such as 123456; or the user account may be a combination of letters, symbols, and digits, for example, abl_23. Therefore, for user accounts in different forms, different algorithms may be used for conversion. To keep the consistency of account conversion, for accounts using a same account mechanism, a same algorithm may be used for conversion. For example, for an instant messaging application A, all user accounts may follow a same algorithm for conversion.

Further, for any user account, according to a calculation requirement of an algorithm, a part, corresponding to the algorithm requirement, in the user account may be obtained for conversion. That is, when the user account includes a character of a first value, continuous characters of a second value may be obtained from the character of the first value according to the calculation requirement of the algorithm, so that conversion is performed based on the continuous characters of the second value. Certainly, all characters included in the user account may be directly converted. This is not specifically limited in this embodiment of the present invention. For example, a user account has 8 digits, and the last 6 digits may be selected as a basis for conversion.

In order to describe a conversion process of the user account, the following provides descriptions on the basis of user accounts in different forms:

For example, a preset algorithm is: first selecting the last 4 characters CDEF of a user account; then multiplying CDEF by 2, to obtain a conversion code C'D'E'F' of CDEF; finally, replacing CDEF with C'D'E'F', so that a feature sequence of the user account is preliminarily obtained. For example, using a user account being 123456 as an example, according to the preset algorithm, first, a character string 3456 is selected, then the character string 3456 is multiplied by 2, to obtain a conversion code 6912; finally, 6912 is added to the rear of 12, so that a feature sequence 126912 of the user account is preliminarily obtained.

If a user account is abl_23, a preset algorithm is: converting English letters into corresponding digits according to an alphabetical order, to obtain a conversion code of the letters. For example, a is ranked first in the alphabet, and a conversion code of a is 1; b is ranked second in the alphabet, and a conversion code of b is 2; z is ranked $26^{th}$ in the alphabet, and a conversion code of z is 26; and the like. Punctuations have a uniform conversion code 000; a digit character is multiplied by 2 to obtain its own conversion code. Finally, original characters in the user account are replaced with conversion codes, so that a sequence number of the user account is preliminarily obtained. For example, using the user account being abl_23 as an example, according to the preset algorithm, a conversion code of a is 1, a conversion code of b is 2, a conversion code of 1 is 2, a conversion code of _ is 000, a conversion code of 2 is 4, and a conversion code of 3 is 6; then, a is replaced with 1, b is replaced with 2, l is replaced with 2, _ is replaced with 000, 2 is replaced with 4, and 3 is replaced with 6; finally, a feature sequence 12200046 of the user is preliminarily obtained after sequential sorting.

Further, in the conversion process, a converted feature sequence may be a duplicate of a feature sequence that has been generated previously.

For example, a preset algorithm is: first, selecting the last 4 characters CDEF of a user account; then multiplying CDEF by 2, to obtain a conversion code C'D'E'F' of CDEF; finally, replacing CDEF with C'D'E'F', so that a feature sequence of the user account is preliminarily obtained. A user account is 15056. According to the preset algorithm, 5056 is first selected and then multiplied by 2, to obtain 10112; finally, 5056 in the user account is replaced with 10112, so that a sequence number 110112 of the user account is preliminarily obtained. Another user account is 110056. According to the preset algorithm, 0056 is first selected and then multiplied by 2, to obtain 0112; finally, 0056 in the user account is replaced with 0112, so that a sequence number 110112 of the user account is preliminarily obtained.

It can be learned through observation that for different user accounts "15056" and "110056", same feature sequences are obtained by using the same preset algorithm. It can be learned that for different user accounts, same feature sequences may be obtained according to a same preset algorithm.

Therefore, to ensure a one-to-one relationship between user accounts and feature sequences, and to avoid an error in a subsequent verification process, it is also necessary to query whether a currently obtained feature sequence is a duplicate. That is, step 202 specifically includes: converting the user account into a feature sequence by using a specified algorithm; determining whether a preset conversion relationship between feature sequences and user accounts includes the feature sequence; using the feature sequence as the first feature sequence if the preset conversion relationship between feature sequences and user accounts does not include the feature sequence; and adding a specified value to the feature sequence, and continuing to perform the determining process until the preset conversion relationship between feature sequences and user accounts does not include a modified feature sequence, if the preset conversion relationship between feature sequences and user accounts includes the feature sequence. The specified value may be determined by the server, and a specific value thereof is not limited in this embodiment of the present invention.

For example, if the user account 15056 and the feature sequence 110112 of the user account are already stored in the server, after the feature sequence 110112 of the user account 110056 is preliminarily obtained, the server determines that the feature sequence already exists, and the server may add a particular value (for example, 20) on the basis of 110112, to obtain a new feature sequence 110132. Then, the server continues to determine whether a preset conversion relationship between feature sequences and user accounts includes 110132. If the preset conversion relationship between feature sequences and user accounts does not include 110132, the server uses 110132 as a feature sequence of the user account 110056; and if the preset conversion relationship between feature sequences and user accounts includes 110132, the server continues with the process of adding the particular value 20 and then performing determining, until the preset conversion relationship between feature sequences and user accounts does include a modified feature sequence.

It should be noted that, to provide reference for a subsequent deduplication process, the conversion relationship between the user account and the feature sequence needs to be stored to a conversion database after the user account is converted into the feature sequence. The foregoing determining process may be processed based on the conversion database.

203: The server provides sensitive operation instruction information to a user according to the first feature sequence, where the sensitive operation instruction information includes at least the first feature sequence.

After obtaining the first feature sequence of the user account by using a preset algorithm, the server generates the sensitive operation instruction information according to a sensitive operation scenario corresponding to the sequence obtaining request, a sensitive operation instruction information template, and the first feature sequence, and displays the generated instruction information to the user; the user performs an operation according to the prompt of the instruction information.

The sensitive operation scenario and the sensitive operation instruction information template may be in a correspondence. For example, the user performs an operation by using a portal page or a client, and the server may provide a popup instruction box, to display the operation that the user needs to perform and the first feature sequence corresponding to the user account to the user, where content included in the instruction box may be "Please enter first feature sequence+new password, and click to send". For another example, the user applies for a sensitive operation by sending an SMS message, and the server may display the sensitive operation instruction information to the user, where a form of the sensitive operation instruction information may be "Please send "GM#first feature sequence#new password" to a specified number".

That the server displays the instruction information including the feature sequence to the user may include the following forms:

In a first form, the user performs an operation by using a portal page or a client, and the server may provide a popup instruction box, to display the operation that the user needs to perform and the feature sequence corresponding to the user account to the user, where content included in the instruction box may be "Please enter 110132+new password, and click to send".

In a second form, if the user applies for a sensitive operation by sending an SMS message, the server may display the sensitive operation instruction information to the user, for example, notifying the user that "Please send GM#110132#new password" to 111111".

Further, after step 203, the method may further include the following steps: deleting the conversion relationship between the first feature sequence and the user account when it is detected that a page applying to obtain a sequence is closed; or deleting the conversion relationship between the first feature sequence and the user account when a sensitive operation request is not received within a specified time.

The page applying to obtain a sequence may refer to a page opened when the user performs a sequence obtaining operation. When it is detected that the page is closed, it may be considered that the user does not need to perform a sensitive operation. Therefore, the conversion relationship between the first feature sequence and the user account may be deleted from a pre-stored conversion relationship. Alternatively, when a sensitive operation request is not received within a specified time, it may be considered that the user does not need to perform a sensitive operation. Therefore, deletion similar to the foregoing process may be performed.

204: A terminal receives the sensitive operation instruction information.

After the terminal receives sensitive operation information sent by the server, the sensitive operation information may be displayed on a terminal page.

205: The user triggers a sensitive operation on the terminal, so that the terminal sends a sensitive operation request to the server, the sensitive operation request carrying the first feature sequence and sensitive operation information.

The triggering a sensitive operation refers to that the user performs a standard operation according to a requirement of the sensitive operation instruction information after successfully receiving the sensitive operation instruction information.

For example, the sensitive operation instruction information is "Please enter 110132+a new password, and click to send", and when the user enters "110132+1234 (the new password)" at a specified position of a page and clicks to send so that the server successfully receives reply information, sending of the sensitive operation request from the terminal to the server is completed.

Further for example, the sensitive operation instruction information is "Please return GM#110132#new password", and after the user correctly edits "GM#110132#1234 (the new password)" and sends it to the server, sending of the sensitive operation request from the terminal to the server is completed.

206: The server receives the sensitive operation request, the sensitive operation request carrying the first feature sequence and the sensitive operation information.

When receiving the sensitive operation request, the server may first verify the sensitive operation request according to a preset sensitive operation request format. When the received sensitive operation request satisfies the preset sensitive operation request format, the verification is passed, and the server executes a subsequent step 207; and if the verification is not passed, the server may reject the sensitive operation request.

207: The server obtains a user account corresponding to the first feature sequence according to the first feature sequence and a preset conversion relationship between feature sequences and user accounts.

Specifically, the server searches, according to the first feature sequence, a list storing the preset conversion relationship between feature sequences and user accounts, and obtains a user account uniquely corresponding to the first feature sequence.

For example, the first feature sequence carried in the sensitive operation request received by the server is 110132, and a user account 110056 corresponding to the first feature sequence 110132 may be obtained by searching the list of the preset conversion relationship between feature sequences and user accounts.

208: The server executes a sensitive operation on the basis of the user account corresponding to the first feature sequence and the sensitive operation information.

When the user account corresponding to the first feature sequence is obtained, on the basis of the sensitive operation information, the sensitive operation may be executed on the user account corresponding to the first feature sequence.

Based on the account example in step 207, a password of the user account 110056 may be modified to be a new password.

It should be noted that step 206 to step 208 in this embodiment of the present invention are described by using an example in which a user currently sends the sensitive operation request and a user requesting to obtain the sequence in step 201 to step 205 are both legal owners of the account. If the user sending the sensitive operation request is not a legal owner of the account, during step 207, it is possible that the corresponding user account cannot be found according to the feature sequence carried by the sensitive operation request, that is, the process of the sensitive operation cannot be completed, thereby protecting the account. In addition, even if the user account is intercepted by another user, actual security of the account is not affected by the interception of the account.

According to the method provided in this embodiment of the present invention, when a sensitive operation is performed, a sensitive operation request no longer directly carries a user account when being sent; instead, the user account is replaced with a feature sequence uniquely identifying the user account, so that other people cannot obtain the user account on the basis of the feature sequence even if they know the sensitive operation request, thereby avoiding leakage of user information and improving security. Further, deduplication processing is performed in a conversion process, thereby avoiding an error operation caused by duplication of feature sequences, and improving the operation accuracy.

Figure 3:
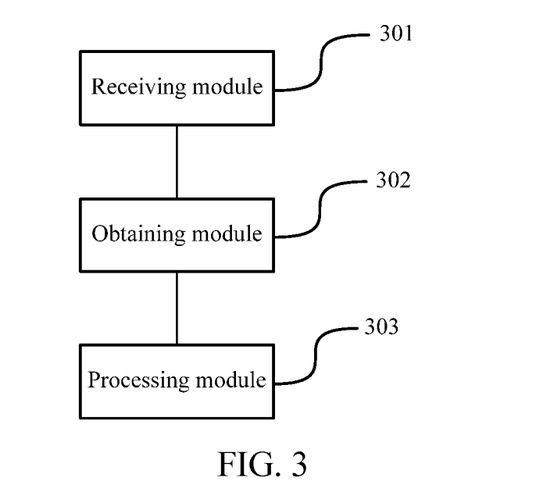
FIG. 3 is a schematic structural diagram of a sensitive operation processing apparatus according to an embodiment of the present invention.

FIG. 3 is a schematic structural diagram of a sensitive operation processing apparatus according to an embodiment of the present invention. Referring to FIG. 3, the apparatus includes:

a receiving module 301, configured to receive a sensitive operation request, the sensitive operation request carrying a first feature sequence and sensitive operation information;

an obtaining module 302, configured to obtain a user account corresponding to the first feature sequence according to the first feature sequence and a preset conversion relationship between feature sequences and user accounts; and a processing module 303, configured to execute a sensitive operation on the basis of the user account corresponding to the first feature sequence and the sensitive operation information.

Optionally, the receiving module 301 is further configured to receive a sequence obtaining request, where the sequence obtaining request carries the user account; and the apparatus further includes:

a conversion module, configured to: convert the user account into the first feature sequence, and save a conversion relationship between the first feature sequence and the user account, where the first feature sequence is used for uniquely identifying the user account; and an instruction module, configured to provide sensitive operation instruction information to a user according to the first feature sequence, where the sensitive operation instruction information includes at least the first feature sequence.

Optionally, the conversion module is configured to: convert the user account into a feature sequence by using a specified algorithm; determine whether the preset conversion relationship between feature sequences and the user accounts includes the feature sequence; use the feature sequence as the first feature sequence of the user account if the preset conversion relationship between feature sequences and user accounts does not include the feature sequence; and add a specified value to the feature sequence, and continue to perform the determining process until the preset conversion relationship between feature sequences and user accounts does not include a modified feature sequence, if the preset conversion relationship between feature sequences and user accounts includes the feature sequence.

Optionally, the apparatus further includes: a deletion module, where the deletion module is configured to: delete the conversion relationship between the first feature sequence and the user account when it is detected that a page applying to obtain a sequence is closed; or delete the conversion relationship between the first feature sequence and the user account when the sensitive operation request is not received within a specified time.

Optionally, the user account is a combination of at least two of three types of characters: digit, letter, and symbol.

Any combination of the foregoing optional technical solutions can form an optional embodiment of the present invention, and details are not described herein.

According to the apparatus provided in this embodiment of the present invention, when a sensitive operation is performed, a user account is no longer directly used to perform a sensitive operation request; instead, the user account is replaced with a feature sequence uniquely identifying the user account, so that even if other people know the sensitive operation request, they cannot obtain the user account on the basis of the feature sequence, thereby avoiding leakage of user information and improving security.

It should be noted that division of the above functional modules are only described as an example when the sensitive operation processing apparatus, provided in the foregoing embodiments, performs a sensitive operation. In actual applications, the functions may be allocated according to needs to be implemented by different functional modules, that is, the internal structure of the apparatus is divided into different functional modules to complete all or some of the above described functions. In addition, the sensitive operation processing apparatus provided in the foregoing embodiment is based on the same concept as the sensitive operation processing method in the foregoing embodiments. For the specific implementation process, refer to the method embodiments, and the details are not described herein again.

Figure 4:
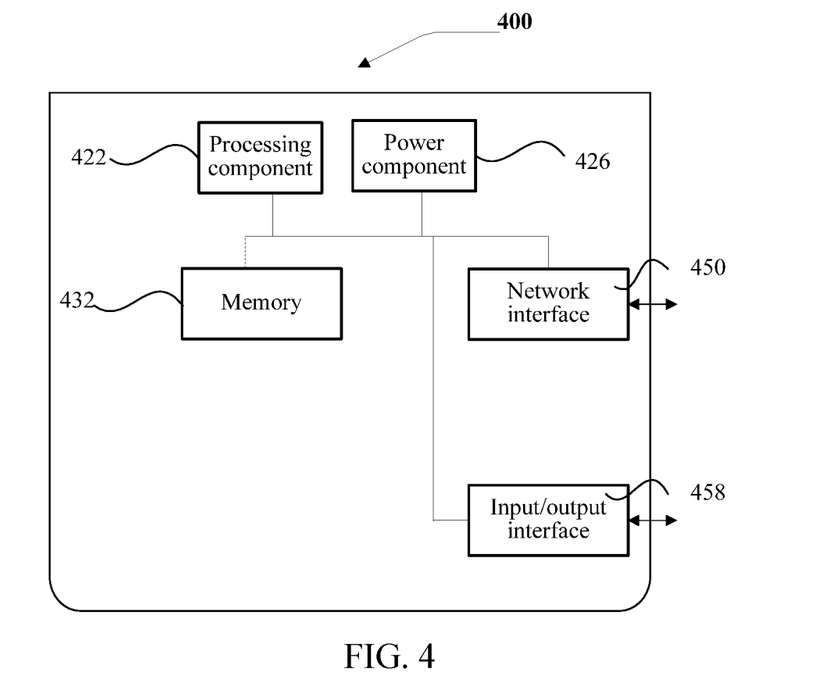
FIG. 4 is a block diagram of a server 400 shown according to an example of an embodiment.

FIG. 4 is a block diagram of a server 400 shown according to an example of an embodiment. Referring to FIG. 4, the server 400 includes a processing component 422 that further includes one or more processors, and a storage resource that is represented by a memory 432 and configured to store instructions, for example, an application program, executed by the processing component 422. The application program stored in the memory 432 may include one or more modules, each of which corresponds to a group of instructions. In addition, the processing component 422 is configured to execute the instructions, so as to execute the sensitive operation processing method shown in the foregoing FIG. 1 or FIG. 2.

The server 400 may further include a power component 426 configured to execute power management of the server 400, a wired or wireless network interface 450 configured to connect the server 400 to a network, and an input/output (I/O) interface 458. The server 400 may operate an operating system, for example, Windows Server™, Mac OS X™, Unix™, Linux™, or FreeBSD™, stored in the memory 432.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

What is described above is merely an example of the embodiments of the present invention, and is not intended to limit the present disclosure. Any modifications, equivalent variations, and improvements made in accordance with the spirits and principles of the present disclosure shall fall within the protection scope of the present disclosure.

What is claimed is:

1. A sensitive operation processing method, comprising:
receiving, by a hardware processor of a server, a sequence obtaining request, the sequence obtaining request comprising a user account identifier of a user, wherein the user account identifier is a combination of at least two of three types of characters comprising: digit, letter and symbol;
converting, by the hardware processor, the user account identifier into a preliminary feature sequence, wherein the preliminary feature sequence is obtained by:
selecting, by the hardware processor, a portion of characters of the user account identifier;
multiplying, by the hardware processor, a predetermined number to the portion of characters selected to obtain a conversion code; and
replacing, by the hardware processor, the portion of characters of the user account identifier with the conversion code, to the user account identifier to generate the preliminary feature sequence;
determining, by the hardware processor, the preliminary feature sequence exists in a preset conversion relationship between feature sequences and user account identifiers;
modifying, by the hardware processor, in response to the preliminary feature sequence existing in the preset conversion relationship, the preliminary feature sequence to generate a modified feature sequence;
saving, by the hardware processor, a conversion relationship between the modified feature sequence and the user account identifier, wherein the modified feature sequence uniquely identifies a user account associated with the user account identifier;
providing, by the hardware processor, sensitive operation instruction information to a remote terminal of the user, wherein the sensitive operation instruction information comprises at least the modified feature sequence;
receiving, by the hardware processor, a sensitive operation request generated by the remote terminal, the sensitive operation request including the modified feature sequence and sensitive operation information;
obtaining, by the hardware processor, the user account identifier associated with the modified feature sequence according to the preset conversion relationship between feature sequences and user account identifiers;
executing, by the hardware processor, a sensitive operation based on the sensitive operation information and the user account identifier; and
deleting, by the hardware processor, the conversion relationship between the modified feature sequence and the user account identifier in response to receipt, from the remote terminal of the user, an indication of a page applying to obtain a sequence being closed, or the sensitive operation request not being received within a specified time.

2. The method of claim 1, wherein the step of converting the user account identifier into the preliminary feature sequence further comprises:
converting, by the hardware processor, the user account identifier into the preliminary feature sequence by using a specified algorithm;
determining, by the hardware processor, whether the preliminary feature sequence exists in the preset conversion relationship between the feature sequences and the user account identifiers;

establishing, by the hardware processor, the preliminary feature sequence as the first modified feature sequence in response to the preliminary feature sequence not existing in the preset conversion relationship between the feature sequences and the user account identifiers; and establishing, by the hardware processor, in response to the preliminary feature sequence existing in the preset conversion relationship between the features sequences and the user account identifiers, the preliminary feature sequence as the modified feature sequence by repeatedly summing a specified value to the preliminary feature sequence until the modified feature sequence does not exist in the preset conversion relationship between the feature sequences and the user account identifiers.

3. A sensitive operation processing apparatus, comprising:
a non-transitory storage medium accessible by a processor, the non-transitory storage medium including:
instructions executable by the processor to receive a sequence obtaining request, the sequence obtaining request comprising a user account identifier, wherein the user account identifier is a combination of at least two of three types of characters comprising: digit, letter and symbol;
instructions executable by the processor to convert the user account identifier into a preliminary feature sequence by causing the processor to:
  select a portion of characters of the user account identifier,
  multiply a predetermined number to the portion of characters selected to obtain a conversion code, and
  replace the portion of characters of the user account identifier with the conversion code, to the user account identifier to generate the preliminary feature sequence;
instructions executable by the processor to determine the preliminary feature sequence exists in a preset conversion relationship between feature sequences and user account identifiers;
instructions executable by the processor to modify, in response to the preliminary feature sequence existing in the preset conversion relationship, the preliminary feature sequence to generate a modified feature sequence;
instructions executable by the processor to save a conversion relationship between the modified feature sequence and the user account identifier, wherein the modified feature sequence uniquely identifies a user account associated with the user account identifier;
instructions executable by the processor to provide sensitive operation instruction information to a remote terminal, wherein the sensitive operation instruction information comprises at least the modified feature sequence;
instructions executable by the processor to receive a sensitive operation request generated by the remote terminal, the sensitive operation request including the modified a first feature sequence and sensitive operation information;
instructions executable by the processor to obtain the user account identifier associated with the modified feature sequence according to the preset conversion relationship between feature sequences and user account identifiers;
instructions executable by the processor to execute a sensitive operation based on the sensitive operation information and the user account identifier corresponding to the modified feature sequence; and
instructions executable by the processor to delete the conversion relationship between the modified feature sequence and the user account identifier in response to receipt, from the remote terminal, of an indication of a page applying to obtain a sequence being closed, or the sensitive operation request not being received within a specified time.

4. The sensitive operation processing apparatus of claim 3, wherein the instructions executable by the processor to convert the user account identifier into the preliminary feature sequence further include:
instructions executable by the processor to convert the user account identifier into the preliminary feature sequence based on a specified algorithm;
instructions executable by the processor to determine the preliminary feature sequence not being included in the preset conversion relationship between the feature sequences and the user account identifiers; and
instructions executable by the processor to establish the preliminary feature sequence as the modified feature sequence in response to the preliminary feature sequence not being included in the preset conversion relationship between the feature sequences and the user account identifiers.

5. A server, comprising:
a hardware processor connected to a non-transitory storage medium, the non-transitory storage medium configured to store instructions executable by the hardware processor to cause the hardware processor to:
  receive a sequence obtaining request, the sequence obtaining request comprising a user account identifier, wherein the user account identifier is a combination of at least two of three types of characters comprising: digit, letter and symbol;
  convert the user account identifier into a preliminary feature sequence, wherein to convert the user account identifier into the preliminary feature sequence, hardware processor executes instructions to select a portion of characters of the user account identifier, multiply a predetermined number to the portion of characters selected to obtain a conversion code, and replace the portion of characters of the user account identifier with the conversion code, to the user account identifier to generate the preliminary feature sequence;
  determine the preliminary feature sequence exists in a preset conversion relationship between feature sequences and user account identifiers;
  modify, in response to the preliminary feature sequence existing in the preset conversion relationship, the preliminary feature sequence to generate a modified feature sequence;
  save a conversion relationship between the modified feature sequence and the user account identifier, wherein the modified feature sequence uniquely identifies a user account associated with the user account identifier;
  provide sensitive operation instruction information to a remote terminal, wherein the sensitive operation instruction information comprises at least the modified feature sequence;
  receive a sensitive operation request, the sensitive operation request including the modified feature sequence and sensitive operation information;

obtain, in response to the sensitive operation request, the user account identifier associated with the modified feature sequence according to the preset conversion relationship between feature sequences and user account identifiers;

execute a sensitive operation based on the sensitive operation information and the user account identifier; and delete the conversion relationship between the modified feature sequence and the user account identifier in response to receipt, from the remote terminal, an indication of a page applying to obtain a sequence being closed, or the sensitive operation request not being received within a specified time.

6. The server of claim 5, wherein the hardware processor is further configured to execute the instructions stored in the non-transitory storage medium to cause the hardware processor to:

convert the user account identifier into a preliminary feature sequence by using a specified algorithm.

7. The server of claim 6, wherein the hardware processor is further configured to execute the instructions stored in the non-transitory storage medium to cause the hardware processor to:

determine the preliminary feature sequence not being included in the preset conversion relationship between the feature sequences and the user account identifiers; and establish the preliminary feature sequence as the modified feature sequence in response to the preliminary feature sequence not being included in the preset conversion relationship between the feature sequences and the user account identifiers.

8. The server of claim 5, wherein the hardware processor is further configured to execute the instructions stored in the non-transitory storage medium to cause the hardware processor to:

determine the page is being closed, the page configured to initiate the sequence obtaining request on the remote terminal; and delete the conversion relationship between first modified feature sequence and the user account identifier in response to the page being closed.

9. The server of claim 5, wherein the hardware processor is further configured to execute the instructions stored in the non-transitory storage medium to cause the hardware processor to:

determine the page is being closed, the page configured to initiate the sequence obtaining request on the remote terminal; and delete the conversion relationship between the modified feature sequence and the user account identifier in response to the sensitive operation request not being received within a specified time.

* * * * *